(12) United States Patent
Person

(10) Patent No.: US 12,291,182 B2
(45) Date of Patent: May 6, 2025

(54) ROAD SURFACE DETECTION USING ANTI-LOCK BRAKING SYSTEM PRESSURE SENSOR

(71) Applicant: Robert Bosch GmbH, Stuttgart (DE)

(72) Inventor: Kurt W. Person, Florence, WI (US)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 17/734,910

(22) Filed: May 2, 2022

(65) Prior Publication Data

US 2023/0347853 A1    Nov. 2, 2023

(51) Int. Cl.
*B60T 8/172* (2006.01)
*B60G 17/016* (2006.01)
(Continued)

(52) U.S. Cl.
CPC .......... *B60T 8/172* (2013.01); *B60G 17/0164* (2013.01); *B60G 17/0165* (2013.01);
(Continued)

(58) Field of Classification Search
CPC .. B60T 8/172; B60T 8/17636; B60T 2210/10; B60T 2260/06; B60T 8/32; B60T 2210/12; B60T 2210/14; B60T 2210/00; B60G 17/0164; B60G 17/0165; B60G 17/0195; B60G 2202/413; B60G 2400/82; B60G 2400/50; B60G 2400/821; B60G 2600/02; B60G 17/0182; B60G 2300/12; B60G 2400/5182; B60G 2500/10; B60G 2500/30; B60G 2600/084; B60G 2800/70;
(Continued)

(56) References Cited

U.S. PATENT DOCUMENTS 5,211,420 A    5/1993 Iwashita
6,385,525 B2   5/2002 Watanabe et al.
(Continued)

FOREIGN PATENT DOCUMENTS

DE    102015107738 A1    11/2016
DE    102021213714 A1    6/2022
KR    100426652 B1 *    4/2004

OTHER PUBLICATIONS

International Search Report and Written Opinion for Application No. PCT/EP2023/060919 dated Sep. 12, 2023 (11 pages).

*Primary Examiner* — Jacob M Amick
*Assistant Examiner* — Charles J Brauch
(74) *Attorney, Agent, or Firm* — Michael Best & Friedrich LLP

(57) ABSTRACT

A road surface detection system, in one example the system includes a hydraulic unit of an anti-lock braking system, the hydraulic unit including a preload adjuster, and a plurality of pressure sensors configured to generate pressure sensor data. The system also includes a controller configured to receive the pressure sensor data from the plurality of pressure sensors, determine a target preload pressure level, compare the pressure sensor data with the target preload pressure level to calculate a pressure differential between the pressure sensor data and the target preload pressure level, determine a road surface based upon the calculated pressure differential, and regulate the preload adjuster to change the pressure within the hydraulic unit based upon the road surface.

19 Claims, 6 Drawing Sheets

(51) Int. Cl.
*B60G 17/0165* (2006.01)
*B60G 17/0195* (2006.01)
*B60T 8/1763* (2006.01)

(52) U.S. Cl.
CPC ...... *B60G 17/0195* (2013.01); *B60T 8/17636* (2013.01); *B60G 2202/413* (2013.01); *B60G 2400/82* (2013.01); *B60T 2210/10* (2013.01); *B60T 2260/06* (2013.01)

(58) Field of Classification Search
CPC ................ B60G 2800/92; B62J 45/41; B62K 2025/044; B62K 25/04; B62K 2025/048
See application file for complete search history.

(56) References Cited

U.S. PATENT DOCUMENTS

| | | |
|---|---|---|
| 8,864,146 B2 | 10/2014 | Murakami et al. |
| 10,350,957 B2 | 7/2019 | Anderson et al. |
| 11,001,120 B2 | 5/2021 | Cox |
| 11,124,036 B2 | 9/2021 | Brady et al. |
| 2021/0025472 A1 | 1/2021 | Marking |

* cited by examiner

|  | Control | Build Up Speed | Rebuild |
|---|---|---|---|
| 0 | Off | N/A | N/A |
| 1 | On | Normal (Approx. 1500rpm) | On (-2.5bar) |
| 2 | On | Normal(1500rpm) | Off |
| 3 | On | Fast(3000rpm) | On (-2.5bar) |

FIG. 5

ROAD SURFACE DETECTION USING ANTI-LOCK BRAKING SYSTEM PRESSURE SENSOR

FIELD

Embodiments, aspects, features, and examples described herein relate to road surface detection using a braking system pressure sensor.

SUMMARY

Anti-lock braking systems are present on many vehicles, including on vehicles such as motorcycles. One aspect of an anti-lock braking system is a preload pressure system that adjusts a brake pressure level in an external shock preload collar. The adjustable pressure levels allow for a control method that monitors externally provided interactions, such as road surface conditions, and automatically adjusts the brake pressure levels based upon these interactions. Therefore, instances and embodiments described herein provide, among other things, systems and methods for detecting a road surface and controlling a brake fluid pressure within a hydraulic circuit of the anti-lock braking system.

In some instances, a road surface detection system includes a hydraulic unit of an anti-lock braking system. The hydraulic unit including a preload adjuster, a plurality of pressure sensors disposed within the vehicle, each of the plurality of pressure sensors configured to generate pressure sensor data, and a controller. The controller is configured to receive the pressure sensor data from the plurality of pressure sensors, determine a target preload pressure level, compare the pressure sensor data with the target preload pressure level to calculate a pressure differential between the pressure sensor data and the target preload pressure level, determine a road surface based upon the calculated pressure differential, and regulate the preload adjuster to change the pressure within the hydraulic unit based upon the road surface.

In some instances, a method of road surface detection includes receiving from each of a plurality of pressure sensors, pressure sensor data, obtaining a target preload pressure level, and comparing, via the controller, the pressure sensor data with the target preload pressure level. The method also includes determining, by the controller, a pressure differential between the pressure sensor data and the target preload pressure level, determining, by the controller, a road surface based upon the pressure differential, and regulating, by the controller, the preload adjuster to change the pressure within the hydraulic unit based upon the road surface.

Other aspects, features, and examples will become apparent by consideration of the detailed description and accompanying drawings.

BRIEF DESCRIPTION OF THE DRAWINGS

FIG. 5 is table illustrating modes of a system of road surface detection using a braking system, according to some aspects.

DETAILED DESCRIPTION

Vehicles, such as motorcycles and other wheeled vehicles, often include a manual preload adjuster for tuning a load level, for example, between two predetermined levels, somethings referred to as a "soft level" and a "hard level." It is preferable to adjust the preload level of a motorcycle to match a desired ride experience. For instance, a rough gravel road may have a different desired preload level than a smooth paved track. In some existing vehicles, adjusting a preload level is performed manually by the rider, before operating the vehicle. For instance, a rider may set a preferable preload level by manually adjusting a mechanical collar of the preload adjuster to the desired load level in order to match the vehicle load or terrain type. Preload adjustments made in such a way are performed before operating the vehicle, and further adjustments cannot be made during operation of the vehicle.

It is also preferable for the preload adjustment to automatically respond to dynamic changes in road conditions. To accomplish this, some vehicles use a semi-active damping control system (SDC) that includes analog inputs, for example, signals from one or more accelerometers, to produce data indicative of road conditions. In some instances, one accelerometer measures vertical acceleration, then generates and outputs a vertical acceleration signal. Another accelerometer measures horizontal acceleration, then generates and outputs a horizontal acceleration signal. A controller receives the vertical acceleration signal and horizontal acceleration signal and generates road roughness coefficient values for use by a SDC algorithm. The controller then uses the SDC algorithm to command the dampeners to perform shock dampening adjustments, thereby responding to changing road conditions.

In addition to adjusting preload levels, such a system may include ride "modes" that a rider may select. For example, a controller may include multiple suspension modes (e.g., sport, street, comfort, off-road, and the like) that correspond to different suspension characteristics, such as suspension height. The controller then uses the selected mode in conjunction with road roughness coefficient values such that dampening adjustments offer the most preferable ride experience for the rider. These automatic adjustments are preferable to a manual adjusted system, as described earlier, as it allows the rider to concentrate on the operation of the vehicle and enjoyment of the ride experience.

The inventors have discovered, among other things, that it may be preferable for the automatic preload adjustment of a SDC to use an input other than an input from an accelerometer.

Figure 1:
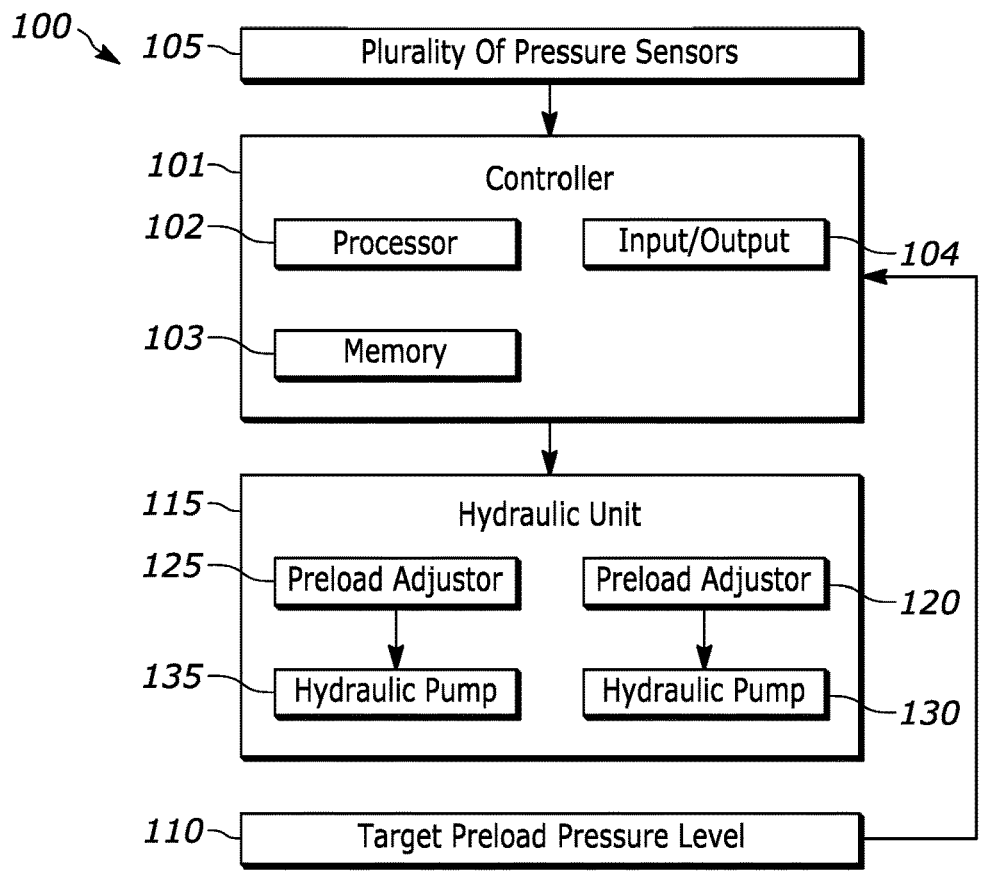
FIG. 1 is an illustration of a system of road surface detection using a braking system, according to some aspects.

FIG. 1 is an illustration of a system 100 for detecting a road surface. The system 100 detects a road surface based upon changes in pressure within a braking system, rather than, for example, using information or signals provided by one or more accelerometers. In the example shown, changes within a hydraulic unit of an ABS are detected. In the example shown, the system includes a controller 101. Controller 101 includes an electronic processor 102 (for example, an electronic microprocessor), memory 103, and input/output interface 104. In some examples, electronic processor 102 is implemented as a microprocessor with separate memory, such as the memory 103. In other examples, the electronic processor 102 may be implemented as a microcontroller (with memory 103 on the same chip). In other examples, the electronic processor 102 may be implemented using multiple processors. In addition, the electronic processor 102 may be implemented partially or entirely as, for example, a field-programmable gate array (FPGA), an applications specific integrated circuit (ASIC), and the like and the memory 103 may not be needed or be modified accordingly. In some examples detailed herein, the memory 103 includes non-transitory, computer-readable memory that stores instructions that are received and executed by the electronic processor 102 to carry out method described herein including methods of road surface detection. The memory 103 may include, for example, a program storage area and a data storage area. The program storage area and the data storage area may include combinations of different types of memory, such as read-only memory and random-access memory. The input/output interface 104 may include one or more input mechanisms and one or more output mechanisms (for example, general-purpose input/outputs (GPIOs), a controller area network bus (CAN) bus interface, analog inputs digital inputs, and the like).

In one example, the system 100 include one or more pressure sensors and the controller 101 is configured to receive signals indicative of pressure information from the one or more pressure sensors. FIG. 1 schematically illustrates a plurality of pressure sensors 105. In the example shown, controller 101 is electrically and communicatively connected to the plurality of pressure sensors 105. In one example, the plurality of pressure sensors 105 are located within the motorcycle. In one example, one pressure sensor is located, for example, within each hydraulic shock absorber of the vehicle. In another instance, the one or more pressure sensor are located within an ABS hydraulic unit. Each one of the plurality of pressure sensors 105 is configured to measure a pressure and produce pressure sensor data (or a signal indicative of a pressure sensor). Controller 101 is configured to receive and interpret the pressure sensor data.

In some examples, the pressure sensor data includes a frequency response of the pressure sensors. This frequency response includes information the controller 101 interprets as information about road surface conditions or terrain type. For example, a rapid frequency response may be indicative of a rough or uneven road surface, such as a gravel road. A slower frequency response may be indicative of another road surface type, such as a flat paved road. Other road surfaces may have other frequency responses indicating road surface conditions, such as potholes, off-road conditions, hill slope, air, borne events, and the like. In some instances, the frequency response is interpreted directly in the ABS system and shared as an output via CAN to other vehicle system controllers. Controller 101 is also configured to receive a target preload pressure level 110. In some examples, the target preload pressure level 110 is generated externally and stored within a non-transitory computer readable storage medium, such as memory 103 of the controller 101. In some examples, the target preload pressure level 110 is set by a rider of the motorcycle.

Controller 101 is also electrically and communicatively connected to a hydraulic unit 115. The hydraulic unit 115 contains a preload adjuster 120. The preload adjuster 120 is configured to set a load level of the motorcycle. In some examples, the hydraulic unit 115 includes more than one preload adjuster. For example, in one instance the hydraulic unit 115 includes the preload adjuster 120 and a preload adjuster 125. Multiple preload adjusters may be needed for vehicles with multiple wheels. For example, a motorcycle may include a front fork shock (for the front wheel) and a rear shock (for the rear wheel). In such an example, preload adjuster 120 is configured to interface with the front shock and preload adjuster 125 is configured to interface with the rear shock. In some examples, preload adjusters 120 and 125 are configured to be regulated by controller 101 independent from one another. For example, preload adjuster 120 may be associated with a target preload pressure level 110 that is different than a target preload pressure level of preload adjuster 125.

Preload adjuster 120 is electrically and communicatively connected to hydraulic pump 130. Hydraulic pump 130 is configured to operably couple with a brake fluid reservoir tank. In some instances, hydraulic pump 130 is configured to provide a fluid from the brake fluid reservoir tank to the hydraulic shocks, regulate a pressure associated with the plurality of pressure sensors 105. In some examples, preload adjuster 125 is also electrically and communicatively connected to the hydraulic pump 135. Similar to hydraulic pump 130, hydraulic pump 135 is configured to operably couple with a brake fluid reservoir tank.

Figure 2:
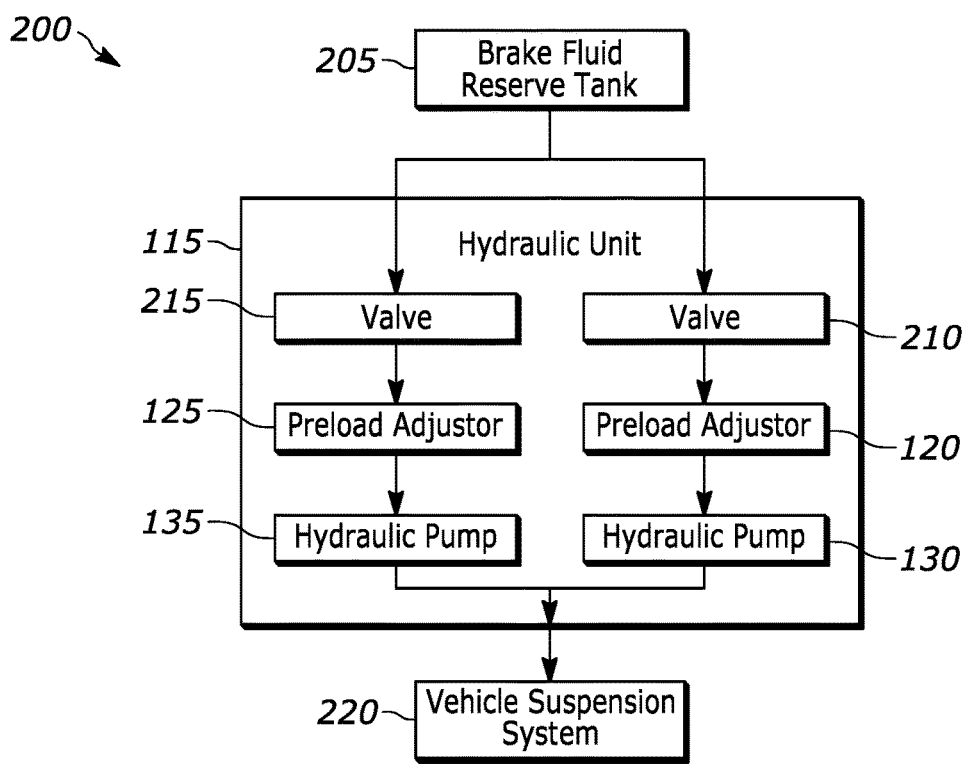
FIG. 2 is an illustration of a hydraulic system of road surface detection using a braking system, according to some aspects.

FIG. 2 is an illustration of a hydraulic system 200 for controlling a vehicle suspension system based upon a detected road surface. In the example illustrated, the hydraulic system 200 includes a brake fluid reservoir tank 205 that holds a fluid for use by the hydraulic unit 115. The hydraulic unit 115 includes a valve 210 connected to the brake fluid reserve tank 205. The valve 210 is configured to open and closed based on control signals. In some instances, the controller 101 sends control signals to the valve 210 when predetermined conditions are met. The valve 210 is connected to preload adjuster 120 and, when open, is provides fluid to the preload adjuster 120. Preload adjuster 120 is operably connected to hydraulic pump 130. Hydraulic pump 130 is operably connected to the vehicle suspension system 220. In some examples, the vehicle suspension system 220 includes a plurality of a motorcycle shocks, such as a front hydraulic shock absorber and a rear hydraulic shock absorber. In some examples, the hydraulic unit 115 includes more than one valve, preload adjuster, and hydraulic pump, such as valves 210, 215, preload adjusters 120, 125, and hydraulic pumps 130, 135.

In some instances, hydraulic system 200 responds to controller 101 by adjusting a hydraulic compression threshold in one of the shocks of the vehicle suspension system 220. For example, when controller 101 determines that a road surface condition threshold has been met, controller 101 controls hydraulic pump 130 to control preload pressure or the hydraulic compression of a rear shock absorber. In such an example, the controller 101 may receive information from the pressure sensors 105 indicative of a change in road surface, a variation in terrain type, or the like. In some instances, hydraulic system 200 controls a rebound dampening rate as a result of changes in road surface conditions.

Figure 3:
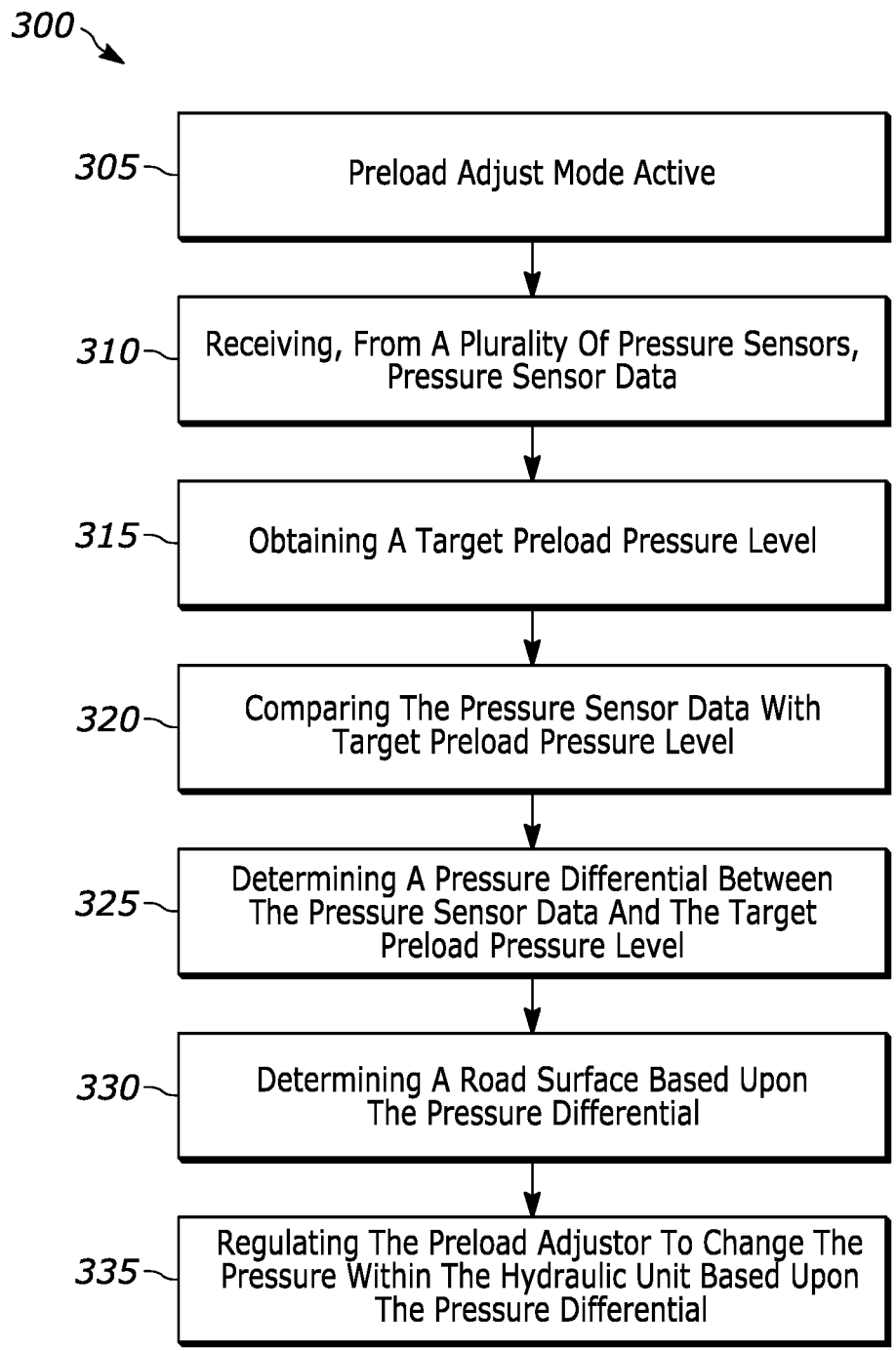
FIG. 3 is a block diagram illustrating a process of detecting a road surface using aa braking system, according to some aspects.

FIG. 3 is an illustration of a process 300 of road surface detection using a braking system. In the example shown, the braking system is an ABS. The process 300 is described as being executed by the electronic processor 102. However, in some examples, aspects of the process 300 is performed by another device. For example, the process 300 may be performed by the processor other than electronic processor 102. In one instance, the process 300 begins at block 305, where the preload adjust mode is active. In some examples, the preload adjust mode must be active for the road surface detection system to operate. In some examples, the preload adjust mode is activated automatically.

At block 310, a plurality of pressure sensors 105 transmit pressure sensor data to a controller, such as controller 101. In some instances, the plurality of pressure sensors 105 measures changes in pressure of the hydraulic shock absorbers of a motorcycle. For example, as a motorcycle navigates a rough gravel road, the shock absorbers of the motorcycle fluctuate, and the plurality of pressure sensors 105 convert these fluctuations into pressure sensor data. The controller 101 then receives the pressure sensor data.

At block 315, the controller 101 obtains a target preload pressure level, such as target preload pressure level 110. The target preload pressure level 110 defines the desired preload pressure for a given ride experience. For example, a rider may find it preferable to have a preload level for navigating a smooth road that is different than a preload level for navigating a rough or uneven road. In some instances, preload-level is adjusted depending upon a vehicle speed. For example, a preload level may be lowered at rest to reduce seat height, raised by a predetermined amount to enhance handling characteristics, or raised fully to increase ground clearance during an off-road ride. Additionally, in some instances, a target preload level is different for a front shock absorber than for a rear shock absorber. For instance, a motorcycle with a heavy carry load attached to a rear saddle bag may have a different target preload level for the rear shock absorber than the target preload level for the front shock absorber.

Pressure sensor data is compared to the target preload pressure level at block 320. In some examples, controller 101 compares the pressure sensor data obtained by the plurality of pressure sensors 105 to the target preload pressure level 110. The plurality of pressure sensors 105 detect changes in pressure over time. In some instances, the controller 101 interprets these changes in pressure over time as differences in features of the terrain upon which a motorcycle is navigating. For instance, as the motorcycle transitions from a smooth, flat track onto a rough, uneven gravel road, the plurality of pressure sensors 105 will produce pressure sensor data indicative of both the flat track and the gravel road.

At block 325 the controller determines a pressure differential between the pressure sensor data and the target preload pressure level. In some instances, the controller also determines a pressure differential response. For instance, as the motorcycle navigates a rough, uneven gravel road, the plurality of pressure sensors 105 produce pressure sensor data indicating the terrain type. The controller 101 interprets the pressure sensor data to determine the pressure differential between the received pressure sensor data and the target preload pressure level 110. In some instances, the pattern of pressure differential between the pressure sensor data and the target preload pressure is indicative of a terrain type. At block 330, the road surface is determined based upon the pressure differential determined in block 325. In some examples, the road surface is determined based upon the pressure differential response. For instance, a smooth, flat track produces a more constant pressure differential than the pressure differential produced by a rough, uneven gravel road. For example, when the motorcycle transitions from a smooth, flat road to a gravel road, the controller 101 determines that the pressure differential changes from a more constant pressure differential to a less constant pressure differential. These changes are indicative of a terrain type.

At block 335, a preload adjuster regulates the pressure within the hydraulic unit based upon the pressure differential. For example, controller 101 instructs preload adjuster 120 to regulate hydraulic pump 130 based upon the pressure differential between the pressure sensor data and the target preload pressure level 110, until the pressure sensor data and the target preload pressure level 110 match each other, or the pressure differential level reaches an acceptable or desired threshold.

Figure 4:
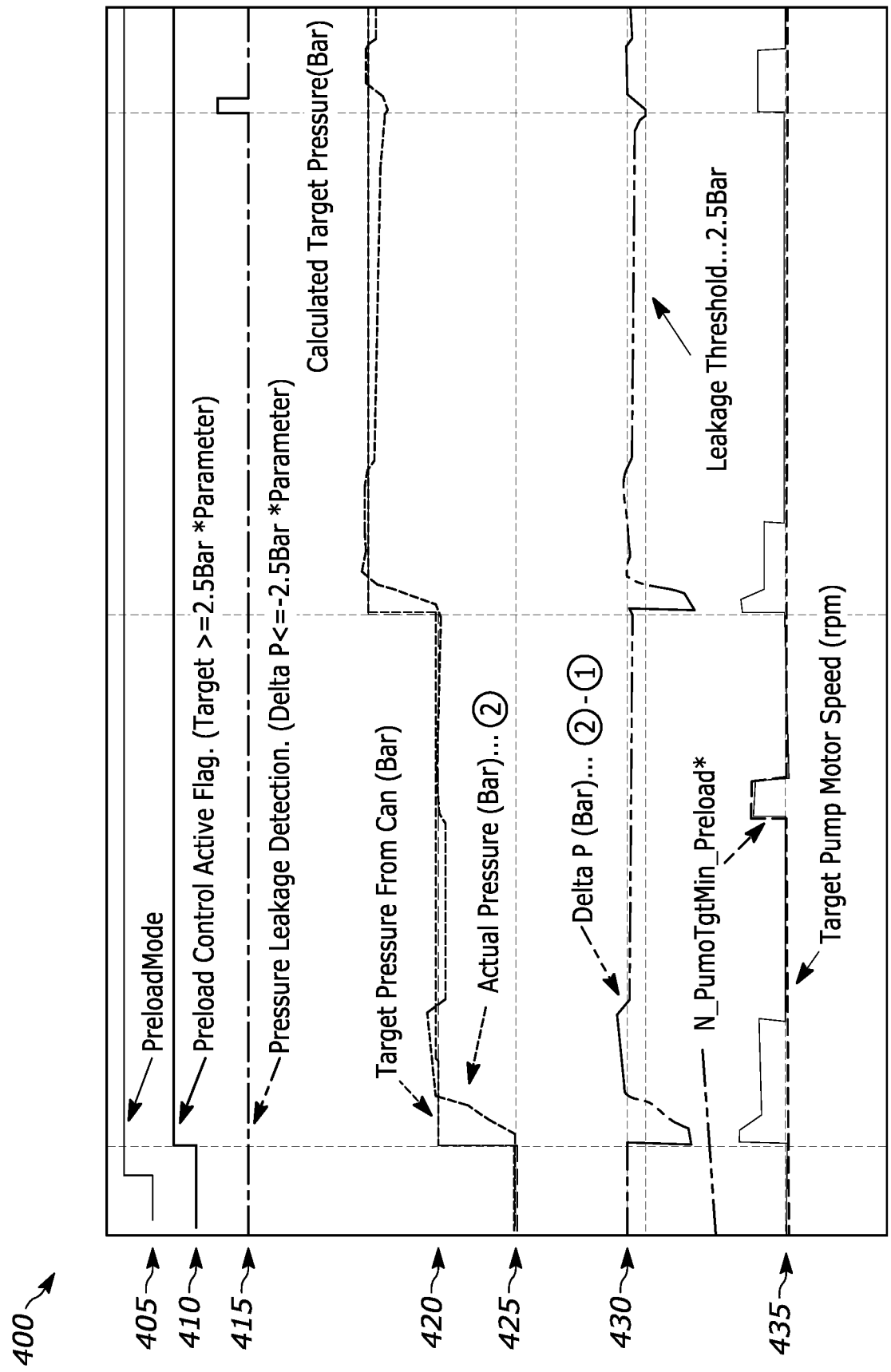
FIG. 4 is a graph with a plurality of traces illustrating command signals and pressures of a system of road surface detection using a braking system, according to some aspects.

FIG. 4 is a graph illustrating a plurality of responses of some aspects of a system of road surface detection. FIG. 4 includes graph 400, which displays some of the control signals and response signals of some aspects of a road surface detection system. Graph 400 includes preload mode trace 405 indicating that preload mode is enabled, such as preload mode active in process 300 at block 305. In the example shown, graph 400 includes preload control active flag trace 410 indicative of an activity level of the road detection system. In some examples, the preload control active flag trace 410 is enabled with a target preload pressure level greater than or equal to 2.5 Bar. In some examples, the target preload pressure level associated with the preload control active flag trace 410 is a pressure level other than 2.5 bar.

Graph 400 includes pressure leakage detection trace 415 indicative of an abnormal decline in pressure within the hydraulic system. For example, if during process 300 a pressure differential is determined to be less than or equal to −2.5 Bar, the pressure leakage detection trace 415 is active. In some instances, the determined pressure differential is a pressure level other than −2.5 bar. In some examples, the pressure leakage detection trace 415 indicates when a pressure change within the hydraulic unit 115 occurs at a time when there is no difference between the target preload pressure level 110 or pressure sensor data produced by the plurality of pressure sensors 105. For instance, a rapid change in the pressure differential or pressure differential response may be indicative of a road surface condition or a change in road surface condition, such as the transition between a smooth track to a rough gravel road. In this instance, the pressure leakage detection trace 415 is not active. In another instance, a slow change in the pressure differential may be indicative of a leak within the hydraulic system, and not a change in road surface conditions. In this instance, the pressure leakage detection trace 415 is active.

Graph 400 includes a target preload pressure level trace 420. In some instances, the target preload pressure level trace 420 is associated with a target preload pressure level 110. In some instances, there is more than one target preload pressure level trace 420 with multiple associated target preload pressure levels. For instance, a target preload pressure level for a front hydraulic shock absorber has a first target preload pressure level trace, and a target preload pressure level for a rear hydraulic shock absorber has a second target preload pressure level trace. In some instances, the first target preload pressure level and the second target preload pressure levels are the same. In some instances, the first target preload pressure level and the second target preload pressure levels are different.

Graph 400 includes a measured pressure level trace 425 (sometimes referred to as actual pressure). In some instances, the measured pressure level trace 425 is associated with pressure level data provided by the plurality of pressure sensors 105. The measured pressure level trace 425 illustrates the pressure level data provided by at least one of the pluralities of pressure sensors. In some examples, the measured pressure level trace illustrates pressure level data multiple of the plurality of pressure sensors. For example, a front hydraulic shock absorber has a first measured pressure level trace associated with at least one of the plurality of pressure sensors of the front hydraulic shock absorber and a rear hydraulic shock absorber has a second measured pressure level trace associated with at least one of the plurality of pressure sensors of the rear hydraulic shock absorber.

Graph 400 includes a pressure differential trace 430 (sometimes referred to as delta P). The pressure differential trace illustrates and is associated with the difference between the target pressure level and the pressure sensor data, such as the pressure differential calculated in process 300 at block 325. In some instances, the pressure differential trace is the difference between the target preload pressure level trace 420 and measured pressure level trace 425. For example, during operation of the hydraulic unit 115, the pressure within the hydraulic unit changes. Pressure differential trace 430 illustrates the difference between the target preload pressure level and the pressure sensor data, and the difference is indicative of a road surface condition and/or a terrain type. In some instances, the pressure differential trace 430 is indicative of a pressure leak condition.

Graph 400 also includes a target pump motor speed trace 435. Target pump motor speed trace 435 illustrates a desired motor pump speed, such as the desired pump speed of hydraulic pumps 130 and 135. For instance, during process 300 at block 335, controller 101 regulates a preload adjuster such as preload adjuster 120 to change the pressure within hydraulic unit 115. In this instance, target pump motor speed trace 435 illustrates the desired pump speed to achieve the regulation within the hydraulic unit.

FIG. 5 is a table 500 illustrating modes of a system of road surface detection using a braking system. Table 500 includes a plurality of operating modes, preload control modes, build up speed for a motor of a pump, and a rebuild target. Table 500 includes mode 0, indicative of the system being off. In mode 0, the preload control mode is inactive and there is no associated pump motor speed. In some examples, mode 0 is associated with preload mode trace 405. Table 500 includes mode 1, in which the preload control mode is active. In this instance, the pump motor speed is set to normal. In some examples, a normal pump motor speed is approximately 1500 revolutions per minute (RPM). In some examples, a normal pump motor speed is an RPM value other than 1500 RPM. In mode 1, the rebuild target on. In some examples, the rebuild target is −2.5 bar. Table 500 includes mode 2, in which the preload control mode is active. In this instance, the pump motor speed is active, the pump motor speed is set to normal, and the rebuild target is off. In mode 2, a normal pump motor speed is 1500 RPM. Table 500 includes mode 3, in which the preload control system is active. In mode 3, the pump motor speed is set to fast. In some examples, a fast pump motor speed is 3000 RPM. In some examples, a fast pump motor speed is an RPM value other than 3000 RPM. In mode 3, the rebuild target is on. In some examples, the rebuild target is set to −2.5 bar.

Figure 6:
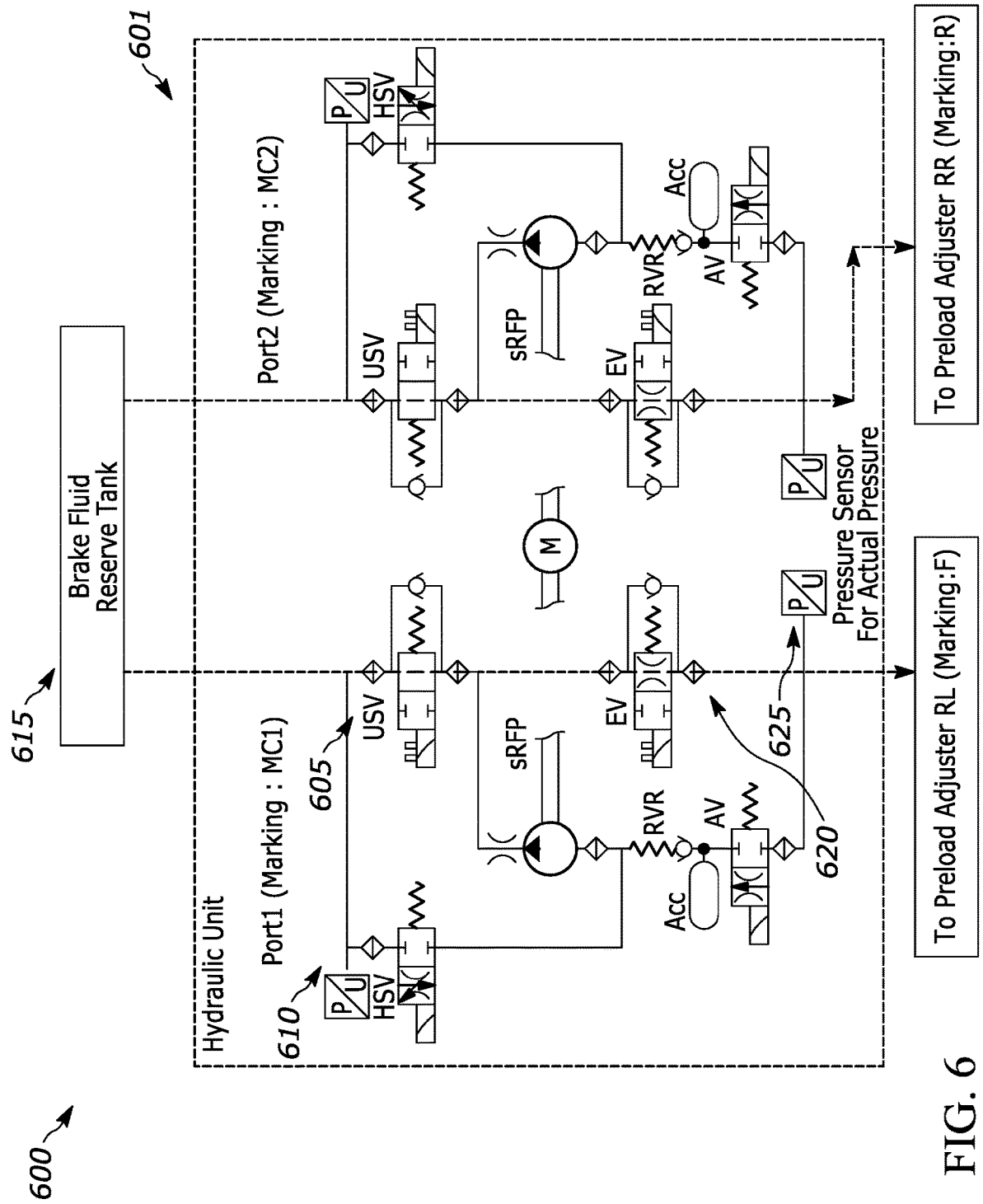
FIG. 6 is an illustration of a hydraulic system of road surface detection using a braking system, according to some aspects.

FIG. 6 is an illustration of a hydraulic system 600 of road surface detection using a braking system, according to some aspects. The hydraulic system 600 is similar to hydraulic system 200 but shown in greater detail. FIG. 6 illustrates the hydraulic system 600 in mode 0, where the preload mode is inactive. Hydraulic system 600 includes hydraulic unit 601. Hydraulic system 600 also includes a first valve 605 in a normally open state. First valve 605 is operatively connected to a second valve 610. Second valve 610 is in a normally closed state. When first valve 605 is open, and second valve 610 is closed, fluid from the brake fluid reservoir tank 615 is allowed to flow through the first valve 605. In some instances, brake fluid reservoir tank 615 is similar to brake fluid reserve tank 205. As fluid flows from the brake fluid reservoir tank 615 flows through the first valve 605, it passes through a third valve 620, the third valve 620 being in a normally open state. The fluid then passes, equalized and at a low level, to a preload adjuster, such as preload adjuster 120.

In some instances, hydraulic system 600 includes additional valves and pumps. Hydraulic system 600 additionally includes pressure sensors 625. For example, pressure sensor 625 measures the pressure within the vehicle suspension system, such as a rear shock absorber. In some examples, pressure sensors 625 performs similar functions as pressure sensors 105. In some examples, the same hydraulic unit used for a vehicle hold control function is used to detect road conditions. For instance, according to some previously described examples, hydraulic system 200 is coupled with hydraulic unit 115 and controller 101, and where controller 101 configured to receive pressure data from pressure sensors 105. Likewise, hydraulic system 600 includes hydraulic unit 601 and pressure sensors 625 and is configured to be coupled with a controller, such as controller 101. In some examples, the pressure sensors 625 provide pressure sensor data for the controller indicating a road surface condition, terrain type, a slope incline, airborne event, or the like. In this example, the pressure sensors 625 are the same as those used for a vehicle hold control function.

Figure 7:
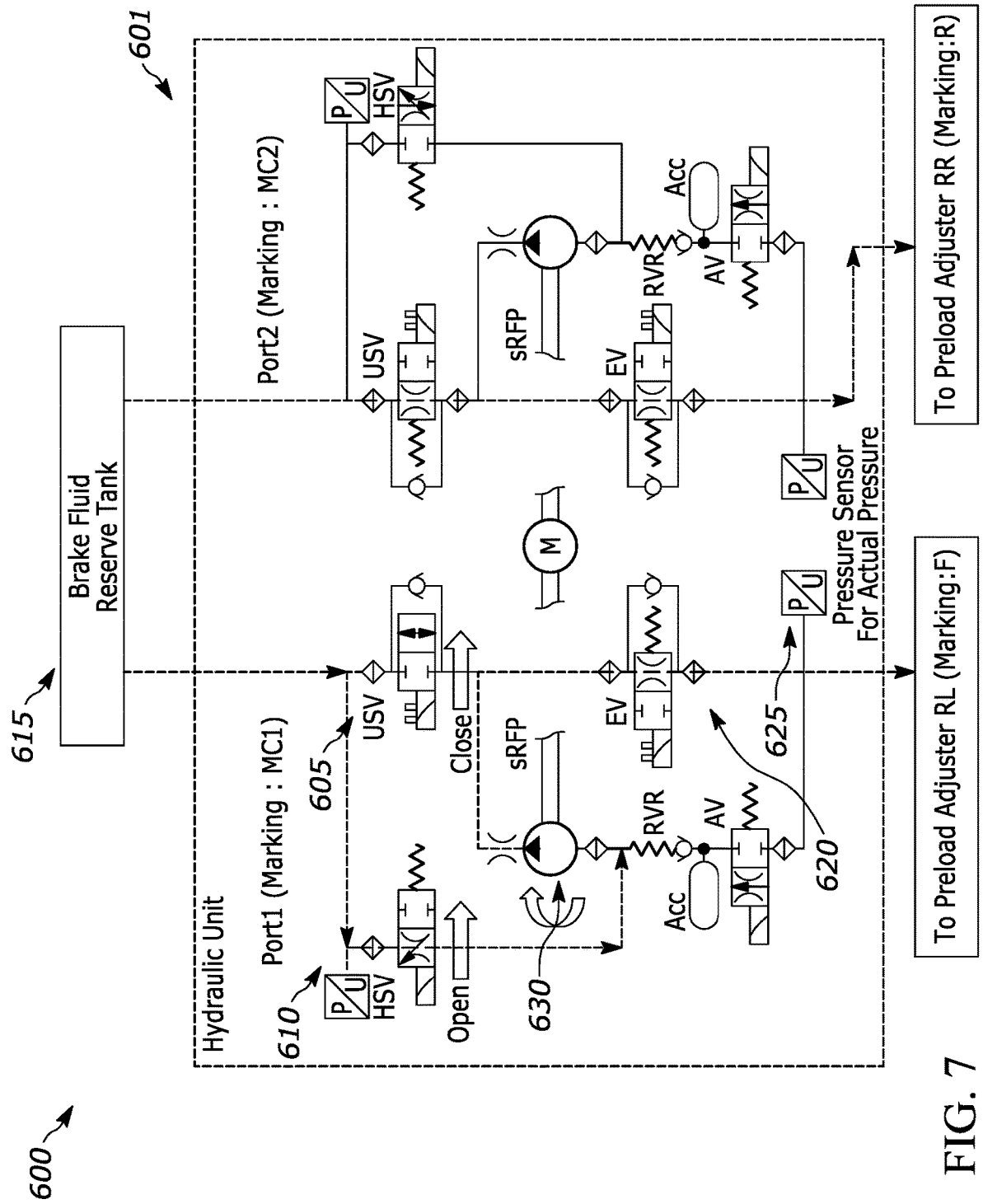
FIG. 7 is an illustration of a hydraulic system of road surface detection using a braking system, according to some aspects.

FIG. 7 illustrates the hydraulic system 600 in a second state or mode. FIG. 7, similar to FIG. 6, illustrates the first valve 605, the second valve 610, the third valve 620, and the brake fluid reserve tank 615. In this instance illustrated by FIG. 7, the hydraulic system is in mode 1, where the preload mode is active. First valve 605 transitions from an open state to a closed state, diverting the flow of fluid from brake fluid reserve tank 615 to the second valve 610. Second valve 610 transitions from a closed state to an open state, allowing fluid to pass therethrough to a hydraulic pump 630. In some instances, hydraulic pump 630 is similar to hydraulic pumps 130, 135. Hydraulic pump 630 actively pumps fluid from brake fluid reservoir tank 615 through the third valve 620, thereby increasing the pressure within the hydraulic system 600.

In some instances, the hydraulic pump actively pumps fluid into, or out of, vehicle suspension system 220 of hydraulic system 200 when a pressure differential is determined. Hydraulic system 600 includes a pressure sensor 625 configured to generate pressure sensor data. This pressure sensor data is used by controller 101 in determining a pressure differential or a pressure differential response. For example, when controller 101 determines a pressure differential, such as at block 325 of process 300, controller 101 regulates hydraulic system 600 to close first valve 605, regulates hydraulic system 600 to open second valve 610, and controls hydraulic pump 630 in order to regulate the pressure within a vehicle suspension system, such as front or rear hydraulic shock absorber spring rate.

Accordingly, various implementations of the systems and methods described herein provide, among other things, techniques for determining a road surface using a braking system pressure sensor. Other features and advantages of the invention are set forth in the following claims.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

What is claimed is:

1. A road surface detection system, the system comprising:
   a hydraulic unit of an anti-lock braking system, the hydraulic unit including a preload adjuster;
   a plurality of pressure sensors disposed within the vehicle, each of the plurality of pressure sensors configured to generate pressure sensor data, and
   a controller configured to:
   receive the pressure sensor data from the plurality of pressure sensors,
   determine a target preload pressure level,
   compare the pressure sensor data with the target preload pressure level to calculate a pressure differential between the pressure sensor data and the target preload pressure level,
   determine a road surface based upon the calculated pressure differential, and regulate the preload adjuster to change the pressure within the hydraulic unit based upon the road surface,
   wherein the determined preload target pressure is based upon a preconfigured vehicle load level.

2. The system of claim 1, wherein the hydraulic unit further includes a first preload adjuster and a second preload adjuster.

3. The system of claim 1, wherein the controller is further configured to receive a preload mode control signal, wherein the controller ignores the determined road surface when the preload mode control signal is disabled.

4. The system of claim 1, wherein the determination of road surface is based upon calculated pressure differential and the rate of change of the pressure sensor data.

5. The system of claim 1, wherein the controller is further configured control a pump to regulate the hydraulic compression spring rate of a shock absorber based upon the calculated pressure differential.

6. The system of claim 1, wherein the controller is further configured control a pump to regulate the rebound dampening rate of a shock absorber based upon the calculated pressure differential.

7. The system of claim 1, wherein the controller is further configured to regulate the preload adjuster to change the spring rate pressure within the hydraulic unit based upon rider commanded modes.

8. The system of claim 1, wherein the controller is further configured to:
   compare the pressure sensor data with the target preload pressure level to calculate a pressure differential response,
   determine a road surface based upon the calculated pressure differential response, and
   regulate the preload adjuster to change the pressure within the hydraulic unit based upon the road surface.

9. The system of claim 2, wherein the controller is further configured to regulate the first preload adjuster based upon the calculated road surface and a first target preload pressure level, and to regulate the second preload adjuster based upon the calculated road surface and a second target preload pressure level, the first target preload pressure level being different than the second target preload pressure level.

10. The system of claim 4, wherein the preload adjuster includes a hydraulic pump configured to change the hydraulic pressure within the hydraulic unit based upon the road surface, the hydraulic pump further configured to change the hydraulic pressure within the hydraulic unit at the rate of change of the pressure sensor data.

11. A method of road surface detection, the method comprising:
   receiving, from each of a plurality of pressure sensors, pressure sensor data;
   obtaining a target preload pressure level;
   comparing, via the controller, the pressure sensor data with the target preload pressure level;
   determining, by the controller, a pressure differential between the pressure sensor data and the target preload pressure level;
   determining, by the controller, a road surface based upon the pressure differential, and
   regulating, by the controller, the preload adjuster to change the pressure within the hydraulic unit based upon the road surface,
   wherein the target preload pressure level is based upon a preconfigured vehicle load level.

12. The method of claim 11, the method further comprising:

regulating, by the controller, a pump to adjust the hydraulic compression pressure of a shock absorber based upon the calculated pressure differential.

13. The method of claim 11, the method further comprising:
regulating, by the controller, a pump to adjust the rebound dampening rate of a shock absorber based upon the calculated pressure differential.

14. The method of claim 11, the method further comprising:
regulating, by the controller, the first preload adjuster based upon the calculated road surface and a first target preload pressure level; and
regulating, by the controller, a second preload adjuster based upon the calculated road surface and a second target preload pressure level, the first target preload pressure level being different than the second target preload pressure level.

15. The method of claim 11, the method further comprising:
regulating, by the controller, a hydraulic pump to change the hydraulic pressure within the hydraulic unit based upon the road surface; and
regulating, by the controller, the hydraulic pump to change the hydraulic pressure within the hydraulic unit at the rate of change of the pressure sensor data.

16. The method of claim 11, the method further comprising:
determining, by the controller, a road surface based upon the pressure differential and a frequency response of the plurality of pressure sensors.

17. The method of claim 11, the method further comprising:
determining, by the controller, a pressure differential response between the pressure sensor data and the target preload pressure level;
determining, by the controller, a road surface based upon the pressure differential response, and
regulating, by the controller, the preload adjuster to change the pressure within the hydraulic unit based upon the road surface.

18. A road surface detection system, the system comprising:
a hydraulic unit of an anti-lock braking system, the hydraulic unit including a preload adjuster;
a plurality of pressure sensors disposed within the vehicle, each of the plurality of pressure sensors configured to generate pressure sensor data, and
a controller configured to:
receive the pressure sensor data from the plurality of pressure sensors,
determine a target preload pressure level,
compare the pressure sensor data with the target preload pressure level to calculate a pressure differential between the pressure sensor data and the target preload pressure level,
determine a terrain type based upon the calculated pressure differential, and
regulate the preload adjuster to change the pressure within the hydraulic unit based upon the terrain type,
wherein the target preload pressure level is based upon a preconfigured vehicle load level.

19. The system of claim 18, wherein the determination of the terrain type is based upon calculated pressure differential and a rate of change of the pressure sensor data.

\* \* \* \* \*